United States Patent [19]

Wakaumi et al.

[11] Patent Number: 5,002,145
[45] Date of Patent: Mar. 26, 1991

[54] METHOD AND APPARATUS FOR CONTROLLING AUTOMATED GUIDED VEHICLE

[75] Inventors: Hiroo Wakaumi; Tsuneo Tsukagoshi, both of Tokyo, Japan

[73] Assignee: NEC Corporation, Japan

[21] Appl. No.: 303,169

[22] Filed: Jan. 26, 1989

[30] Foreign Application Priority Data

| Jan. 29, 1988 | [JP] | Japan | 63-20588 |
| Jan. 29, 1988 | [JP] | Japan | 63-20589 |
| Oct. 25, 1988 | [JP] | Japan | 63-269736 |

[51] Int. Cl.⁵ ............................................. B62D 1/24
[52] U.S. Cl. ..................................... 180/168; 340/935
[58] Field of Search ................... 180/167, 168, 169; 340/935, 933, 994; 901/1, 46, 47; 364/513

[56] References Cited

U.S. PATENT DOCUMENTS

| 4,627,511 | 12/1986 | Yajima | 180/167 |
| 4,652,004 | 3/1987 | Wirth et al. | 180/168 |
| 4,751,658 | 6/1988 | Kadonoff et al. | 180/168 |
| 4,777,601 | 10/1988 | Boegli | 180/168 |

OTHER PUBLICATIONS

"Magnetic Lattice Lane Guide for AGV Use", by T. Tsukagoshi et al., 5th International Conference on Automated Guided Vehicle Systems, Diamond Hotel Tokyo, Japan, Oct. 6-8, 1987.
Autonomous Vehicle, by Y. Ichikawa et al., AGVS 1985.

Primary Examiner—Charles A. Marmor
Assistant Examiner—Richard Camby
Attorney, Agent, or Firm—Laff, Whitesel, Conte & Saret

[57] ABSTRACT

In a method of controlling travel of an automated guided vehicle, the automated guided vehicle is guided to travel along a guide marker arranged in a lattice form when the automated guided vehicle goes straight, and, when it turns, curve travel by autonomous control from a starting lattice point to a target lattice point.

4 Claims, 7 Drawing Sheets

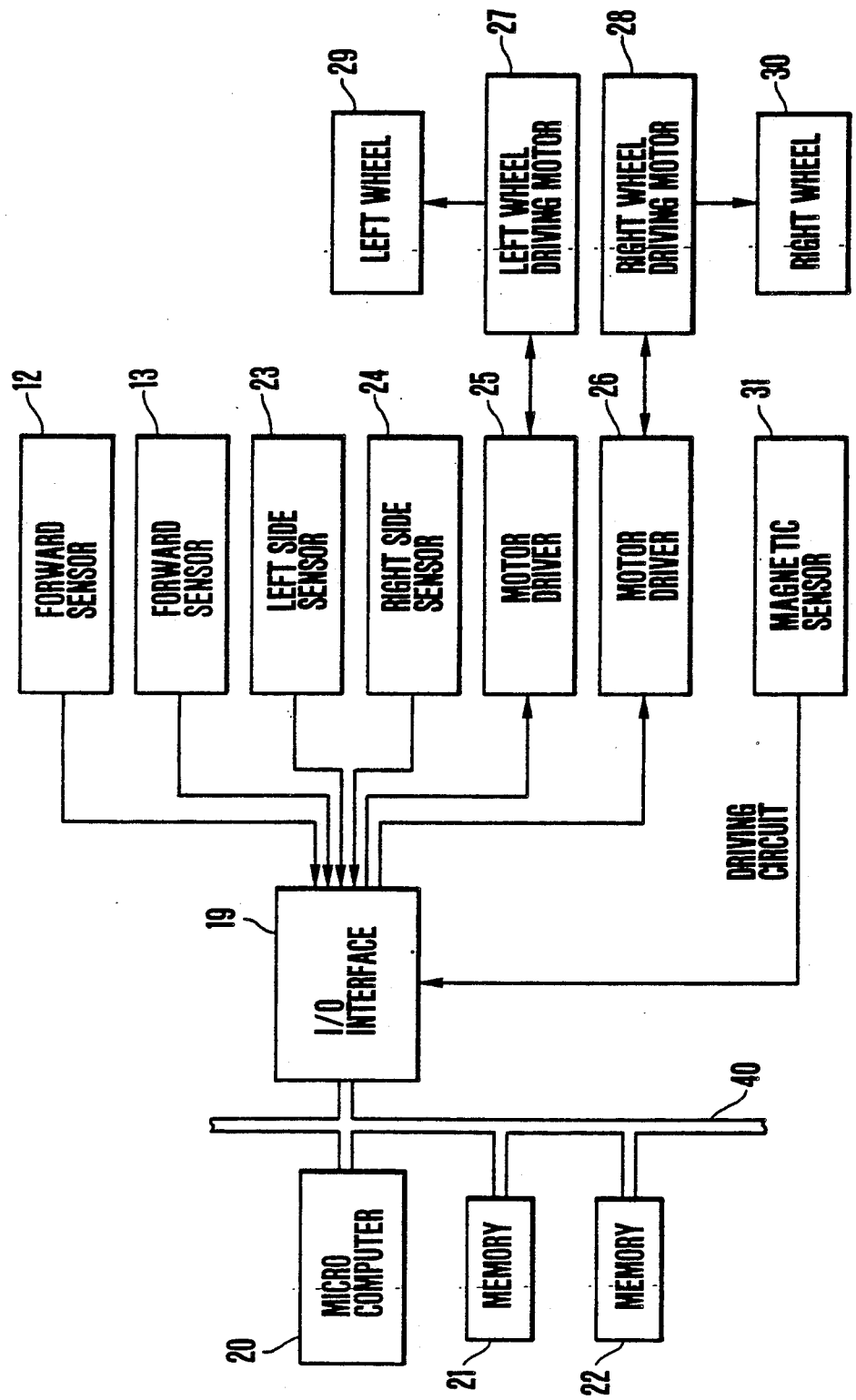

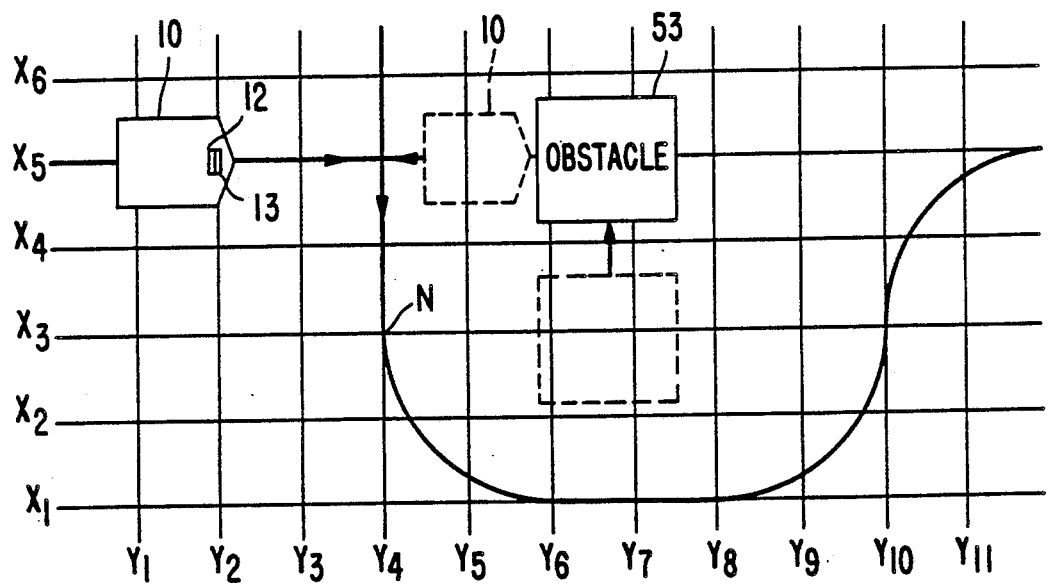
FIG. 8
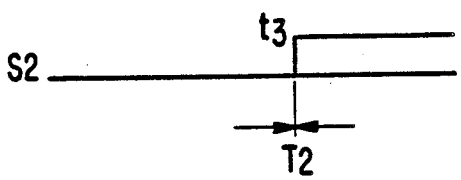

METHOD AND APPARATUS FOR CONTROLLING AUTOMATED GUIDED VEHICLE

BACKGROUND OF THE INVENTION

The present invention relates to a method and apparatus for controlling an automated guided vehicle.

Automated guided vehicles have been put into practical applications in the field of Factory Automation, and have been greatly contributing to development of industries. In the field of office automation, an attempt is made to employ an automated guided vehicle to provide services associated with mails, office machines, tea serving, and the like. The present applicant has already developed an automated guided vehicle control system using a magnetic lattice guide lane developed for the office automation (5th International Conference on Automated L. Guided Vehicle Systems, 1987).

FIG. 1 shows an automated guided vehicle travel control system using a conventional lattice guide lane. In FIG. 1, the lattice guide lane consists of lattice guide markers $X_1$ to $X_4$ and $Y_1$ to $Y_5$, and the like obtained by spreading on a floor, in a matrix format, P-tiles in each of which a cross-, T-, or L-shaped magnetic marker is buried. Assuming that a vehicle 1 which goes along the guide marker $Y_1$ and approaches a point S before a cross-point A with the guide marker $X_2$ must go from the point A to a point $E(X_2,Y_5)$ via a point C $Y_3$), the travel operation is performed as follows in the conventional system. The vehicle 1 goes from the point A to a point B along the guide marker $Y_1$ while detecting the magnetic marker by a magnetic sensor, temporarily stops at the point B, and then turns right in 90°. The vehicle 1 then goes ahead along the guide marker $X_4$, and reaches a point D via the point C. The vehicle 1 temporarily stops at this point D, turns right in 90°, and then goes along the guide marker $Y_5$ to reach the point E.

The travel control described above is performed while being guided by the guide markers, and has an advantage in safety in that the vehicle does not easily overrun. However, since the vehicle must be temporarily stopped at a corner when it turns, a lead time is undesirably prolonged. Since the conventional vehicle has only one sensor (infrared sensor) for detecting a forward obstacle, it can avoid an already detected obstacle, or the like. However, the vehicle cannot travel while recognizing the presence/absence and size of an arbitrarily laid down obstacle and avoiding it.

When the traveling vehicle suddenly encounters an obstacle ahead, since a distance between the obstacle and the vehicle is small, the vehicle may collide against the obstacle while avoiding the obstacle by a right-angle turn. In addition, a vehicle basically travels straight, and performs a right-angle turn when it changes a direction. Therefore, a travel time for executing the avoiding operation is greatly prolonged.

SUMMARY OF THE INVENTION

It is an object of the present invention to provide a method and apparatus for controlling travel of an automated guided vehicle, which can eliminate the conventional drawbacks, and with which a vehicle need not be temporarily stopped at a corner when it turns, and can smoothly avoid an obstacle which suddenly appears in front of the vehicle by a reverse travel operation or autonomous travel along a curve within a short travel time.

A method of controlling travel of a vehicle according to the present invention comprises steps of guiding the automated guided vehicle along a guide marker arranged in a lattice form when the automated guided vehicle goes straight, and when the automated guided vehicle turns, causing it to perform an autonomous travel along a curved path from one lattice point to another lattice point.

The method further comprises steps of detecting an obstacle in front of the automated guided vehicle by a first sensor system attached to the automated guided vehicle, and causing the automated guided vehicle to perform a mode of travel constituting of a combination of guide-controlled and autonomous travels while maintaining a distance to the obstacle by using a second sensor system attached to the automated guided vehicle.

An apparatus for controlling travel of an automated guided vehicle which performs a guided travel along a guide marker formed in a lattice form and an autonomous travel on a curved path according to the present invention comprises: two front detectors attached to a front portion of the automated guided vehicle and having different detection distances; and a controller, provided to the automated guided vehicle, for obtaining a time difference $T_X$ between obstacle detection signals from the two front detectors, for comparing the time difference $T_X$ with a prestored reference value $T_R$, for, when $T_X<T_R$, recognizing the obstacle as an emergency obstacle, and when $T_X \geq T_R$, recognizing the obstacle as an existing obstacle, and for supplying data corresponding to a travel mode constituted by a combination of the guided travel and the autonomous travel according to a detected case to a wheel drive system of the automated guided vehicle.

BRIEF DESCRIPTION OF THE DRAWINGS

FIG. 3 is a block diagram showing an arrangement of a signal processing system, a wheel drive system, and a control system mounted in an automated guided vehicle according to the present invention;

FIGS. 7(A) and 7(B) are waveform charts showing output signals from sensors 12 and 13 shown in FIG. 3 in the travel control shown in FIG. 6, respectively;

FIG. 8 is a view showing still another embodiment of the method of the present invention;

FIGS. 9(A) and 9(B) are waveform charts showing output signals from the sensors 12 and 13 in the travel control shown in FIG. 8, respectively.

DETAILED DESCRIPTION OF THE PREFERRED EMBODIMENTS

Figure 2:
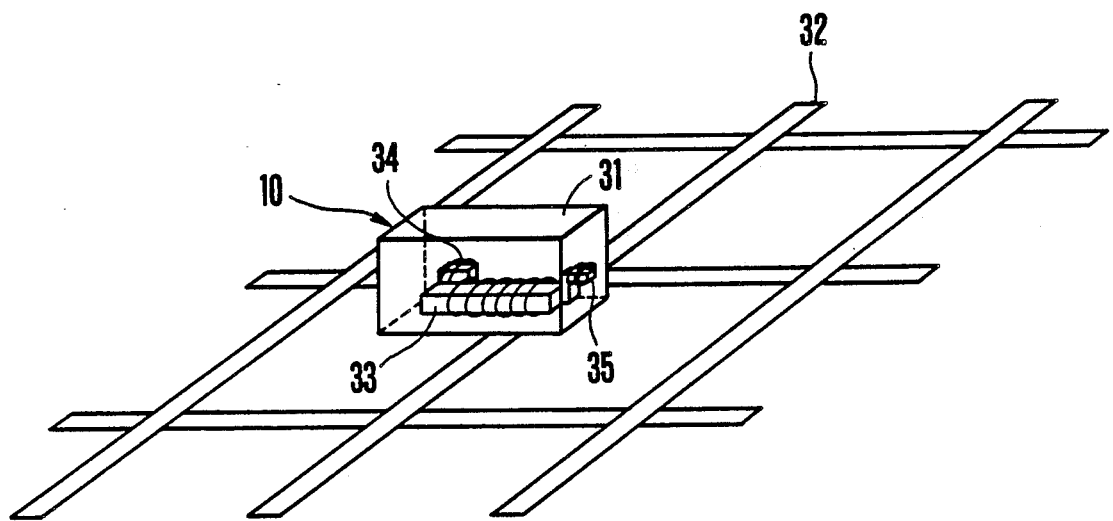
FIG. 2 is a view for explaining an automated guided vehicle guide system to which the present invention is applied.

FIG. 2 is a schematic view showing an arrangement of an automated guided vehicle guide system to which the present invention is applied, and FIG. 3 shows a signal processing system, a wheel drive system and a control system mounted in an automated guided vehicle 10 shown in FIG. 2. In FIG. 2, reference numeral 32 denotes lattice guide markers obtained by spreading on a floor in a matrix format, P-tiles in each of which a cross-, T-, or L-shaped ferrite magnetic marker is buried. Reference numeral 31 denotes a conventional magnetic sensor, assembled in the vehicle 10, for detecting the magnetic marker. The magnetic sensor 31 comprises an excitation coil 33 for magnetizing the ferrite guide marker 32, left and right, i.e., two detection coils 34 and 35 for detecting a change in magnetic field, and a signal processing circuit (not shown), including a rectifier, amplifier, and the like, for rectifying and amplifying outputs from the detection coils 34 and 35.

As shown in FIG. 3, the vehicle 10 is provided with infrared forward sensors 12 and 13 for detecting a forward obstacle, and left and right side sensors 23 and 24 for detecting left and right obstacles (although these sensors 12, 13, 23 and 24 are not shown in FIG. 2). The forward sensors 12 and 13 are set to have different detection distances (e.g., the sensor 12 has a detection distance of 1.5 m, and the sensor 13 has a detection distance of 1.2 m). In this manner, the forward sensors 12 and 13 output different signals depending on the type of the obstacle as described later. The detection outputs from the magnetic sensor coils 34 and 35 and the forward sensors 12 and 13 are input to a microcomputer 20 through an I/O interface 19. The microcomputer 20 outputs a signal associated with a travel direction and speed of the vehicle 10 through the I/O interface 19 to motor drivers 25 and 26 in accordance with a program and data stored in memories 21 and 22, thereby controlling rotations of left and right wheel driving motors 27 and 28 which rotate the left and right wheel 29 and 30, respectively. In this manner, vehicle travel is controlled.

Note that the I/O interface 19 performs synchronization between peripheral devices having a low processing speed such as the sensors 12, 13, 23, 24, and 31, the motor drivers 25 and 26, and the like, and the microcomputer 20 having a high processing speed.

Figure 1:
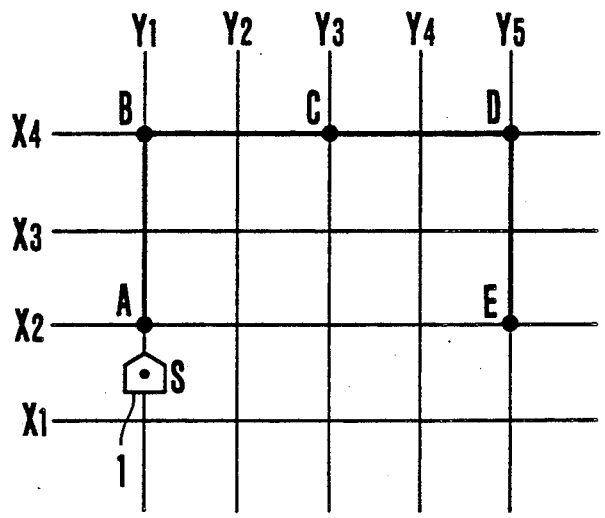
FIG. 1 is a view showing a conventional travel control method of an automated guided vehicle.
Figure 4:
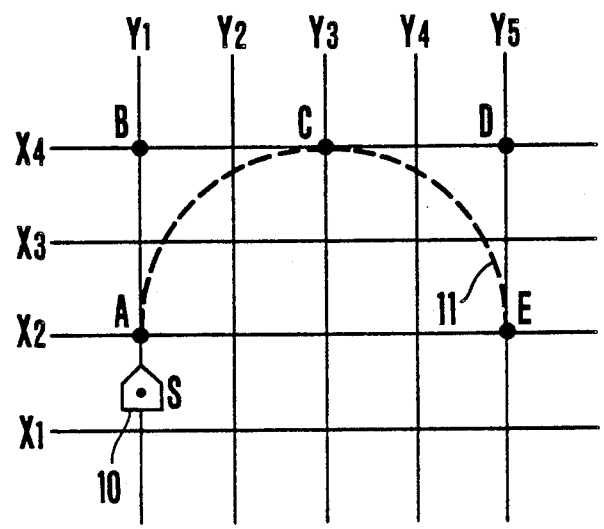
FIG. 4 is a view showing an embodiment of a travel control method of an automated guided vehicle according to the present invention.

FIG. 4 is a view for explaining an embodiment of a vehicle travel control method according to the present invention. In FIG. 4, the same reference numerals and symbols denote the same constituting elements as in FIG. 1. Assume that in FIG. 4, a vehicle 10 which traveled straight along the guide marker $Y_1$ from the lower portion to the upper portion of FIG. 4 is passing a point S in front of a cross-point A of the guide markers $X_2$ and $Y_1$, and will travel to a cross-point E of the guide markers $X_2$ and $Y_5$ via a point A and a cross-point C of the guide markers $X_4$ and $Y_3$ In this invention, the vehicle travels along a curved path 11 represented by a dotted line which starts from the point A and reaches the point E without passing through the cross-points B and D. In this case, the vehicle 10 is guide-controlled along the guide marker $Y_1$ until the point A by detecting the guide marker $Y_1$, but starts autonomous travel after the point A. More specifically, the rotational speeds of left and right wheels 29 and 30 of the vehicle 10 are made to have a difference from each other. In FIG. 4, the rotational speed of the left wheel 29 is larger than that of the right wheel 30. Thus, the displacement angle of the wheels 29 and 30 with respect to the travel direction of the vehicle 10 is determined by the difference in the rotational speeds of the wheels 29 and 30. An actual travel distance is determined by numbers of rotations of the wheels 29 and 30. The microcomputer 20 monitors the numbers of rotations of the wheels 29 and 30 by using the number of pulses output from the encoder attached to gears of the driving motors 27 and 28, and compares the numbers of rotations of the wheels 29 and 30 with travel setting data prestored in the memories 21 and 22 as a map. When the monitored numbers of rotations exceeds a preset number of rotations corresponding to a length of the curved path 11, the microcomputer 20 returns the steering angles of the wheels 29 and 30 to "0" to stop autonomous travel, and sets the vehicle 10 in a guide travel state for straight travel. While the vehicle 10 travels from the point A to the point E via the point C, autonomous travel along the curved path 11 is performed, and guide-controlled travel by the guide markers $Y_1$ and $Y_5$ is performed for the straight portions. Thus, the vehicle 10 need not be stopped at a corner, and a travel distance can be shortened unlike in the conventional system, thus greatly shortening a lead time. Since perfect autonomous control is not employed but guide control is performed for straight portions, the vehicle can be prevented from overrun. More specifically, a system which has both a high-grade function and high safety and reliability can be realized.

As described above, with the travel control method of a vehicle according to the present invention, an efficient system which can shorten a travel path, and can greatly shorten a lead time can be realized. Since guide-controlled travel is performed for almost the entire path, a transportation service system with high reliability can be realized. Such a merit can be enhanced in a large-scale office, multi-purpose office, and the like having many curved portions.

In the above embodiment, curved travel starts and ends when the magnetic lattice points are detected, respectively. However, in another embodiment a different travel pattern in which a middle portion (straight portion) other than the lattice point is monitored may be employed. More specifically, the present invention can be applied to any curved pattern travel. Furthermore, a guide method is not limited to one using guide markers, but may be one using a medium such as a reflection tape, reflection object, electromagnetic guide wire, or the like.

Figure 5:
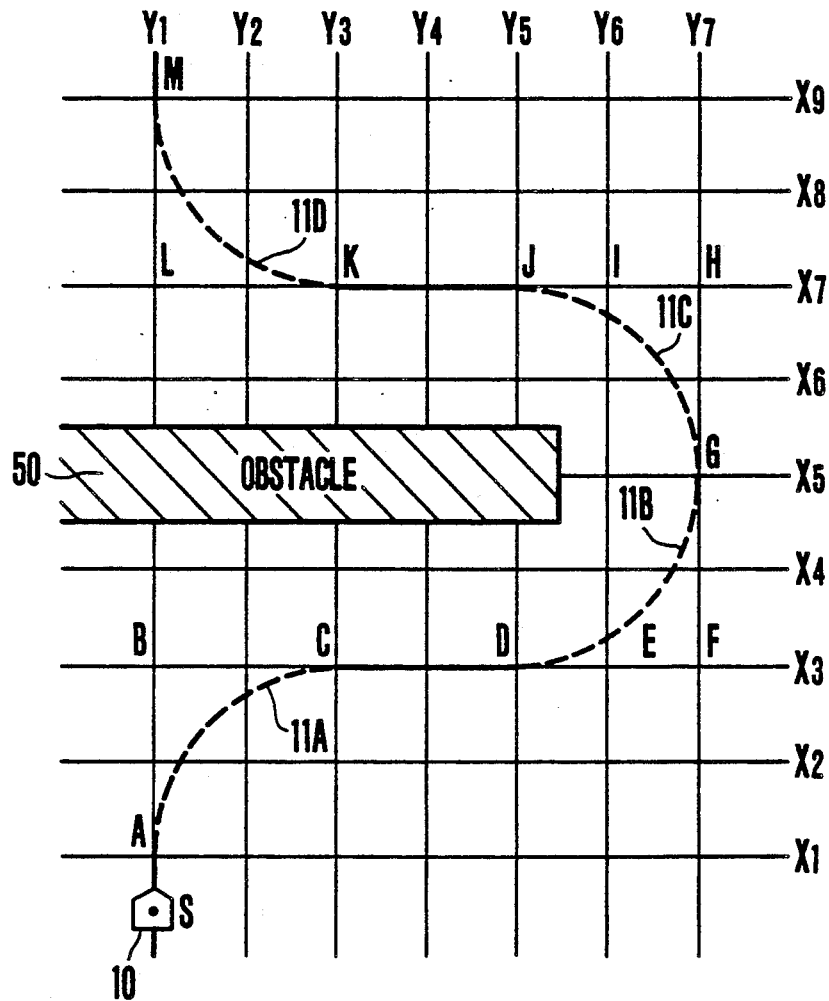
FIG. 5 is a view showing another embodiment of the method of the present invention.

FIG. 5 is a view for explaining another embodiment of a travel control method of a vehicle according to the present invention. In FIG. 5, the same reference numerals and symbols denote the same constituting elements as in FIG. 4.

In this embodiment, when the vehicle 10 recognizes an obstacle 50 in front of it by the forward sensors 12 and 13 while passing the point S, the vehicle 10 stops linear guided travel from the point $A(X_1,Y_1)$, and autonomously travels to the right by the same control as in the embodiment shown in FIG. 4 to the lattice point $C(X_3,Y_3)$ along a curved path 11A. At the point C, if the obstacle 50 is still detected by the left side sensor 23, the vehicle 10 is guide-controlled to go straight along the guide marker $X_3$. When the obstacle 50 is no longer detected by the left side sensor 23 at the point $D(X_3,Y_5)$ the vehicle autonomously travels in a direction where the obstacle 50 is present, i.e., to the left along a curved path 11B At a point G(X$_5$,Y$_7$) where the extending line of the obstacle 50 and the curved path 11B intersect with each other, since no obstacle is detected in a forward direction, the vehicle 10 travels from the point G to a point J(X$_7$,Y$_5$) along a curved path 11C curved to the left. The point J is present on the same guide marker Y$_5$ as the point D. The vehicle 10 is guide-controlled to go straight along the guide marker X$_7$ from the point J to a point K(X$_7$,Y$_3$) present on the same guide marker Y$_3$ as the point C. From the point K, the vehicle 10 autonomously travels along a curved path 11D which is curved in a direction to separate from the obstacle, and then reaches a point M on the guide marker Y$_1$.

In this manner, an obstacle 50 is detected by sensors 12, 13, 23 and 24 for three directions, and straight guide travel and curved autonomous travel are performed, so that the vehicle 10 travels along not a travel course preset as map data so as to avoid a fixed obstacle in a conventional system but can travel while selecting an optimal course for avoiding an arbitrarily laid down obstacle. Such travel can be performed without making any stop, and a travel path can be shortened since the vehicle 10 can travel along a curve. Therefore, travel with a short lead time can be performed.

When a vehicle 10 is simply guide-controlled by a conventional method, it passes the point A or B and goes straight, and collide against the obstacle 50. When guide travel is performed only by attaching an obstacle sensor to a vehicle, the vehicle goes straight via points A, B, C, D, E, I, J, K, L, and M. Therefore, the vehicle must be stopped four times during travel, and a lead time is prolonged. In this invention, neither such a collision phenomenon nor a long lead time occurs. In this invention, since the vehicle is guide-controlled to go straight for almost the entire system, overrun can be prevented, and a system with high safety and reliability can be realized.

Figure 6:
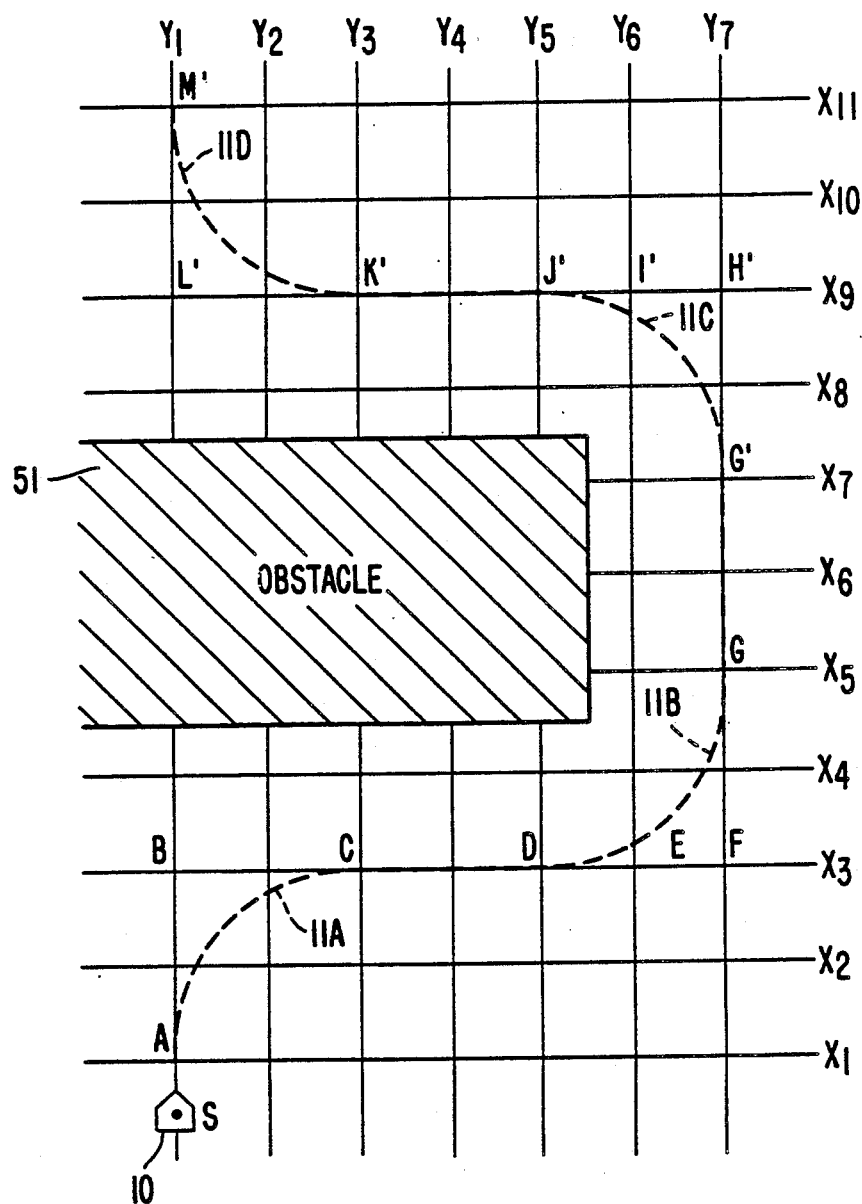
FIG. 6 is a view showing still another embodiment of the method of the present invention.

FIG. 6 is a view for explaining still another embodiment of a travel control method of a vehicle according to the present invention. In FIG. 6, the same reference numerals and symbols denote the same constituting elements as in FIGS. 4 and 5.

This embodiment exemplifies a travel control method when an obstacle 51 extends for a certain distance in the Y direction. In this case, the vehicle 10 travels along the same course by the same operation as in the embodiment shown in FIG. 5 from the point A to the point G. At the point G, since the left sensor 23 detects the obstacle 51, the vehicle 10 can no longer autonomously travel along a curve, and is guide-controlled to go straight along the guide marker Y$_7$ In this manner, when the vehicle 10 has reached a point G'(X$_7$,Y$_7$), it autonomously travels along a curve 11C curved in a direction where the obstacle 51 is present, i.e., to the left, and then reaches a point J'(X$_9$,Y$_5$) Thereafter, the same control operation as in the embodiment shown in FIG. 5 is performed, and the vehicle 10 enters the guide marker Y$_1$ from a point M'(X$_{11}$,Y$_1$).

In this manner, when the size of the obstacle 51 is variously changed, it can be coped with by adopting straight guide travel in the X and Y directions regardless of the obstacle size. The obstacle 51 need not be detected in advance before travel. The characteristic feature of this invention is that when the obstacle 51 is arbitrarily laid down, the vehicle 10 can travel while flexibly avoiding it.

As described above, according to the travel control method of a vehicle of the present invention, the vehicle 10 can travel along a shortest course in a shortest time without being stopped while detecting and avoiding an arbitrary obstacle. Therefore, a system with high flexibility and efficiency can be realized.

As described above, the sensors 12 and 13 for detecting a forward obstacle are set to have different detection distances. Therefore, assuming that the obstacle 51 shown in FIG. 6 is a still obstacle, the sensor 12 which can detect an obstacle at a far distance outputs a signal S$_1$ at time t$_1$ first, as the vehicle 10 approaches the obstacle 51 as shown in FIG. 7(A). As the vehicle further approaches the obstacle 51, the sensor 13 which can detect the obstacle 51 at a near distance outputs a signal S$_2$ at time t$_2$ having a time difference T$_1$ from the time t$_1$ as shown in FIG. 7(B). As long as the vehicle 10 travels at a normal speed (within about 100 m/min), T$_1$ is 100 msec or longer.

When a mobile obstacle 53 suddenly appears in front of the vehicle 10, as shown in FIG. 8, the two forward sensors 12 and 13 mounted on the vehicle 10 detect the obstacle 53 at substantially the same time t$_3$, and output signals S$_1$ and S$_2$ at substantially the same timing as shown in FIG. 9(A) and 9(B). For this reason, a time difference T$_2$ between the output signals S$_1$ and S$_2$ from the two forward sensors 12 and 13 becomes almost zero or is several tens of msec or less if any. A reference value T$_R$, for example, of about 50 msec is stored in the memory 21 of the vehicle 10, and is compared with the time differences T$_1$ and T$_2$ of the detection signals from the sensors 12 and 13, so that the type of the obstacle 53 can be easily identified. More specifically, if T$_1 \geq$ T$_R$, the vehicle 10 identifies that the detected obstacle 53 is an existing obstacle, and if T$_2 <$ T$_R$, it identifies that the detected obstacle 53 is an emergency obstacle. Therefore, the vehicle 10 can select an optimal route for avoiding the obstacle 53.

Such identification is performed by a signal processing circuit for performing arithmetic processing in the microcomputer 20. The reference value T$_R$ is prestored in the memory 21 before the vehicle 10 is started. As the memory 21, any types of memories such as an SRAM, DRAM, EPROM, and the like may be employed. When the memory 21 is also used as a memory which performs a read/write access during operation, an SRAM or DRAM is used. When the output signals S$_1$ and S$_2$ are output from the sensors 12 and 13, respectively, times t$_1$ and t$_2$ at which the signals S$_1$ and S$_2$ are output are written in the R/W memory 22 under the control of the microcomputer 20 through the I/O interface 9. The microcomputer 20 performs a subtraction (t$_2$−t$_1$=T$_1$), and compares the difference T$_1$ with the reference value T$_R$ stored in the memory 21. The microcomputer 20 determines a travel mode depending on whether or not the comparison result is positive or negative. More specifically, when the result is positive (T$_1 \geq$ T$_R$), a flag "1" is set in a software manner in the microcomputer 20. When the flag "1" is set, travel data for setting the subsequent obstacle avoiding operation in a smooth travel mode by a combination of straight travel and autonomous travel modes is selected. In contrast to this, when the comparison result is negative (T$_1 <$ T$_R$), a flag "0" is set in a software manner. When the flag "0" is set, travel data for setting the subsequent obstacle avoiding operation in a travel mode by a combination of backward movement, 90° turn, straight travel, and autonomous travel modes is selected, as will be described in the following embodiment.

A travel control method when an emergency obstacle is detected will be described below. As shown in FIG. 8, when the obstacle 53 suddenly appears in front of the traveling vehicle 10 (indicated by a dotted line), the vehicle 10 is moved backward to a nearest lattice point or a point on a different guide marker (a magnetic marker or optical marker other than the lattice marker) so as not to collide against the obstacle 53 during the following avoiding operation. In this case, during the backward movement, the vehicle 10 travels while detecting the guide marker. When a lattice point $(X_5,Y_4)$ is detected, the vehicle 10 is stopped. The vehicle 10 turns right in 90°, so that the direction of the vehicle 10 is turned to an avoiding direction. Thereafter, the vehicle 10 goes straight to a point $N(X_3,Y_4)$ separated by at least two lattices from the lattice point $(X_5,Y_4)$ while detecting the obstacle 53 by the left side sensor 23. When the obstacle 53 is no longer detected, the vehicle 10 autonomously starts to travel along a curve from the point N to the left in which the obstacle 53 is present. In FIG. 8, the vehicle 10 draws an arc having a radius corresponding to two lattices. The vehicle 10 is then guide-controlled to go straight until the obstacle 53 on the left of the vehicle 10 is no longer detected, and autonomously travels again along a ½ arc in a direction where the obstacle 53 is present. Thereafter, if the number of lattice points through which the vehicle 10 traveled at the beginning of the avoiding operation is 4 or more, the vehicle 10 goes straight by a distance corresponding to these extra lattice points The vehicle 10 autonomously travels along a ½ arc (in a direction to separate from the obstacle 53) to return to the starting guide marker $X_5$. Thereafter, the vehicle 10 is guide-controlled to go straight along the starting guide marker $X_5$.

The operations of the signal processing circuit and the wheel drive system during the avoiding operation are as follows. When the vehicle 10 travels along the guide marker 32 (in FIG. 2), the magnetic sensor 31 supplies a signal obtained by detecting a change in magnetic field by the guide marker 32 to the memory 22 as data through the I/O interface 19. When a voltage corresponding to a deviation from the center position of the guide marker 32 is equal to or higher than an insensitive voltage (e.g., +0.4V), number of pulses per unit time corresponding to the voltage is read out from the memory 21 and supplied to the motor drivers 25 and 26 through the I/O interface 19 so as to give a rotational speed difference between the left and right wheels 29 and 30 so that the vehicle 10 is returned to the center of the guide marker 32.

During this operation, when an obstacle 53 suddenly appears as shown in FIG. 8, the above-mentioned time comparison is performed, and the next travel mode for avoiding the emergency obstacle 53 is selected. In this mode, a command for moving the vehicle 10 backward is read out from the memory 21 so that rotational speeds and directions represented by the pulses per unit time are supplied from the motor drivers 25 and 26 to the left and right wheel driving motors 27 and 28, respectively. Thus, the backward movement of the vehicle 10 is performed. During the backward movement, the magnetic sensor 31 detects the guide marker 32, and a sum signal of voltages produced in the left and right detection coils 34 and 35 is supplied to the memory 22. When the microcomputer 20 performs a calculation for comparison and determines that the sum signal has reached a level exceeding a threshold voltage (stored in the memory 21), it identifies that a lattice point is detected. Thus, a stop command is supplied from the memory 21. In response to this command, the currents output from the motor drivers 25 and 26 are stopped, and the vehicle 10 is stopped.

Then, a turn command for turning the vehicle 10 right in 90° is read out from the memory 21, and predetermined numbers, of pulses are outputted from the motor drivers 25 and 26, thereby rotating the left and right wheel driving motors 27 and 28. Thus, the left and right wheels 29 and 30 are turned in 90°. Guide travel is then started in accordance with map data stored in the memory 21.

The microcomputer 20 always monitors signals from the left and right side sensors 23 and 24 and stores in the memory 22 and detect the presence of the signals. The microcomputer 20 counts lattice points through which the vehicle 10 pass by using the sum signal from the magnetic sensor 31 and determines whether a lattice point count is 2 or more. If the lattice point count is 2 or more, new travel data for the next autonomous travel mode is read out from the memory 21 when no signals from the side sensors 23 and 24 are detected. When the next lattice point is counted, the microcomputer 20 causes the vehicle 10 to travel in accordance with the new travel data.

In this autonomous travel mode, numbers of pulses per unit time to be supplied to the left and right wheel driving motors 27 and 28 are read out from the memory 21 and supplied to the motor drivers 25 and 26 so as to give a rotational speed difference between the left and right wheels 29 and 30 in correspondence with a radius of turn and travel speed. When the number of pulses have reached a predetermined number, a command for performing the next guide travel is read out from the memory 21, and the vehicle 10 goes straight while performing the same command as described above.

At the same time, the signals from the left and right side sensors 23 and 24 are also monitored. When the microcomputer 20 determines that the signals are no longer detected, a command for the next autonomous travel operation is read out, and is executed in the same manner as described above. When the vehicle 10 starts guide travel for returning to the starting guide marker, the microcomputer 20 calculates a number obtained by subtracting 4 from the number N of lattice points stored by the travel operations so far, and causes the vehicle 10 to travel straight by the calculated number. More specifically, the lattice points are counted during guide travel, and when it is confirmed that the count is equal to N−4, data for the next autonomous mode is read out and executed. Travel along the starting guide marker is executed in the same manner as described above.

When the above-mentioned operations are executed, the microcomputer 20 can be divided into two or more systems to separately execute works. For example, the microcomputer 20 is divided into a system for supplying a command to the motor drivers 25 and 26 control the operations of the wheels 29 and 30 and a system for receiving data from the various sensors, and these systems may be controlled by separate microcomputers.

When the above-mentioned avoiding operation is performed, the vehicle can be prevented from colliding against an obstacle even during an obstacle avoiding operation, and does not perform a 90° turn each time it changes a direction unlike in the conventional avoiding operation. Therefore, the avoiding operation can be performed within a short period of time. According to an experiment, a travel time could be shortened to a time about 65% of a time required for the conventional avoiding operation (a guide marker of about 6 m).

Figure 10:
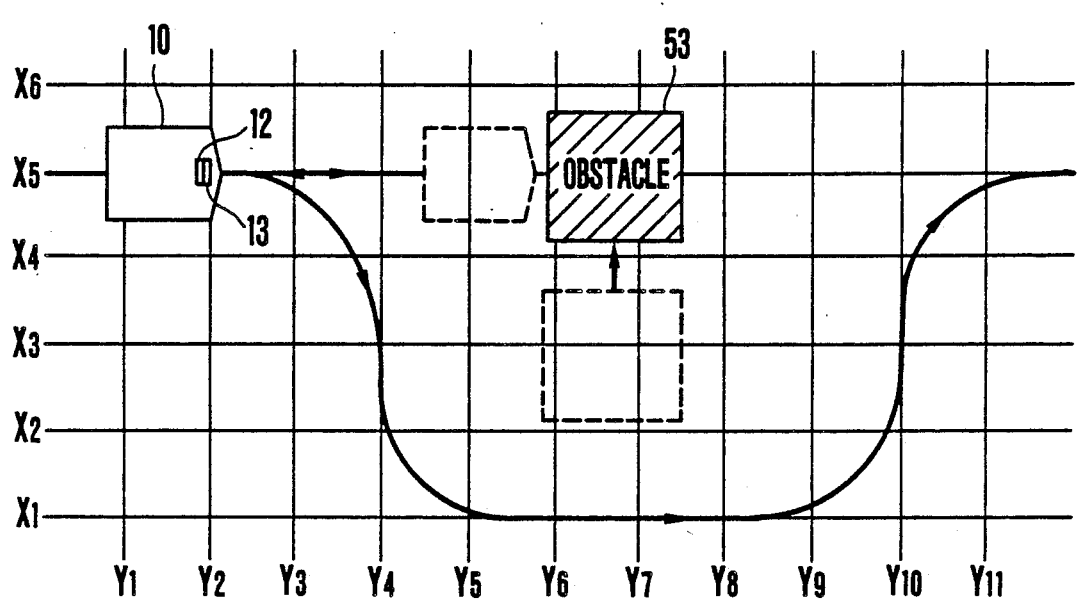
FIG. 10 is a view showing still another embodiment of the method of the present invention.

FIG. 10 is a view for explaining still another embodiment of a travel control method of a vehicle 10 for avoiding an emergency obstacle. In FIG. 10, the same reference numerals and symbols denote the same constituting elements as in FIG. 8. Unlike in FIG. 8, according to the embodiment shown in FIG. 10, after a suddenly entering obstacle 53 is detected, the vehicle 10 is moved backward to a lattice point separated by about four lattices from the detection point so as not to collide against the obstacle 53 during the following avoiding operation, and 25 autonomously goes forward along a ¼ arc in a direction to separate from the obstacle 53 without performing a 90° turn. With this operation, an idle time required for the turn can be omitted. In this case, a combination of arcuated autonomous travel in the direction of the obstacle 53, straight guide travel, and autonomous travel along a ¼ arc, and an operation for causing the vehicle 10 to go straight are the same as those in FIG. 8. With the above operation, a travel time required for moving the vehicle 10 backward can be shortened, and obstacle avoidance can be performed within a short travel time.

As can be apparent from the above embodiment, forward obstacle detection sensors having different detection distances are arranged, and a time difference of output signals from the forward sensors 12 and 13 is compared with a reference value to automatically identify the type of the obstacle. Therefore, an obstacle can be avoided in an intelligent manner. According to the travel control method for performing an obstacle avoiding operation including a backward movement and autonomous travel, obstacle avoidance can be performed with high reliability and within a short travel time even in an emergency state. According to the above embodiments, a system which can automatically select a route for avoiding an arbitrary object and has high flexibility and efficiency can be realized. Since the vehicle guide-travels along almost the entire magnetic guide marker, a transportation service system with high safety and reliability can be realized.

In the above description, the present invention is applied to a method using a magnetic guide marker. However, the present invention is not limited to this. For example, the present invention can be applied to a method using another medium such as reflection tape, reflection article, electromagnetic guide wire, or the like.

What is claimed is:

1. A method of controlling travel of an automated guided vehicle, comprising the steps of:
    guiding said automated guided vehicle along a guide marker arranged in a lattice form when said automated guided vehicle goes straight;
    when said automated guided vehicle turns, causing it to perform an autonomous travel along a curved path from one lattice point to another lattice point;
    providing, in said autonomous travel, necessary deviation angles to left and right wheels of said automated guided vehicle at the one lattice point;
    monitoring numbers of rotations of said left and right wheels during the autonomous travel in order to measure a travel distance of said automated guided vehicle;
    comparing the travel distance with a value corresponding to a length of the curved path; and
    nullifying the deviation angles of said left and right wheels when the travel distance coincides with the value in order to cause said automated guided vehicle to go straight by a guiding step.

2. A method of controlling travel of an automated guided vehicle, comprising the steps of:
    guiding said automated guided vehicle along a guide marker arranged in a lattice form when said automated guided vehicle goes straight;
    when said automated vehicle turns, causing it to perform an autonomous travel along a curved path from one lattice point to another lattice point;
    detecting an obstacle in front of said automated guided vehicle by first sensor means attached to said automated guided vehicle, the step of detecting the obstacle including the step of comparing a time difference $T_X$ of obstacle detection signals obtained from two front sensors which are included in said first sensor means and having different detection distances with a reference value $T_R$ and, when $T_X$ is smaller than $T_R$, identifying the detected obstacle as an emergency obstacle and when $T_X$ is equal to or larger than $T_R$, identifying the detected obstacle as an existing obstacle; and
    causing said automated guided vehicle to perform a mode of travel comprising a combination of guide-controlled and autonomous travels while maintaining a distance to the obstacle by using second sensor means attached to said automated guided vehicle.

3. An apparatus for controlling travel of an automated guided vehicle which performs a guided travel along a guide marker formed in a lattice form and an autonomous travel on a curved path from one lattice point to another lattice point, comprising:
    two front sensors attached to a front portion of said automated guided vehicle and having different detection distances; and
    a controller, provided to said automated guided vehicle, for obtaining a time difference $T_X$ between obstacle detection signals from said two front detectors, for comparing the time difference $T_X$ with a prestored reference value $T_R$, for, when $T_X < T_R$, recognizing the obstacle as an emergency obstacle, and when $T_X \geq T_R$, recognizing the obstacle as an existing obstacle, and for supplying data corresponding to a travel mode constituted by a combination of the guided travel and the autonomous travel according to a detected case to a wheel drive system of said automated guided vehicle.

4. An apparatus according to claim 3, further comprising left and right sensors for detecting obstacles on left side and right side of said automated guided vehicle, respectively.

* * * * *